(12) United States Patent
Isomursu et al.

(10) Patent No.: US 6,370,389 B1
(45) Date of Patent: *Apr. 9, 2002

(54) COMMUNICATION NETWORK TERMINAL SUPPORTING A PLURALITY OF APPLICATIONS

(75) Inventors: Pekka Isomursu, Oulu; Juhani Miettunen, Alpritie; Mikko Lietsalmi, Oulu; Arto Lehtonen; Petri Nykanen, both of Tampere; Patrik Gustafsson, Espoo, all of (FI)

(73) Assignee: Nokia Mobile Phones, Ltd., Salo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/183,169

(22) Filed: Oct. 30, 1998

Related U.S. Application Data

(63) Continuation of application No. 08/804,236, filed on Feb. 20, 1997.

(30) Foreign Application Priority Data

Feb. 26, 1996 (FI) .................................................. 960895

(51) Int. Cl.⁷ ................................................ H04Q 7/20
(52) U.S. Cl. ........................ 455/466; 455/420; 455/414
(58) Field of Search ................................ 455/410, 418, 455/419, 420, 556, 557, 466, 31.3, 38.1, 186.1, 575, 412, 413, 414; 379/216, 354, 355, 93.24, 100.08, 93.23, 90.01, 93.09; 709/206, 218, 332, 337, 313, 317, 319, 329; 345/300, 334, 339, 352, 351; 235/375; 376/311, 318, 320, 349; 359/172, 159

(56) References Cited

U.S. PATENT DOCUMENTS 5,062,132 A    10/1991  Yasuda et al. ................ 379/61
5,303,288 A  * 4/1994   Duffy et al. ................. 379/355
5,335,276 A    8/1994   Thompson et al. ........... 380/21
5,351,235 A    9/1994   Lahtinen ...................... 455/560
5,404,580 A    4/1995   Simpson et al. .............. 455/89
5,422,656 A    6/1995   Allard et al. ................ 345/173
5,426,594 A  * 6/1995   Wright ..................... 340/825.4
5,465,401 A    11/1995  Thompson ................... 455/89
5,485,505 A  * 1/1996   Norman et al. ............. 455/566

(List continued on next page.)

FOREIGN PATENT DOCUMENTS

WO         WO/ 94/17481         8/1994

OTHER PUBLICATIONS

Global System for Mobile Communications (GSM) documents: TS GSM 02.04, TS GSM 02.30, TS GSM 02.90, TS GSM 03.38, TS GSM 03.40.

"Telecommunication Networks: Protocols, Modeling and Analysis", Mischa Schwartz, Addison–Wesley, ISBN 0–201–16423–X, pp. 12–19.

Microsoft Exchange User Handbook Working with Contacts pp. 590–594, Jan. 1997.* vCard Electronic Business Card Business Card pp. 1–5, Jan. 1997.*

Primary Examiner—Nay Maung
Assistant Examiner—Jean A Gelin
(74) Attorney, Agent, or Firm—Perman & Green, LLP

(57) ABSTRACT

The present invention relates to a terminal (1) for a communication network, the terminal being capable of supporting a plurality of applications (17, 18) and having means of communicating user messages. The terminal comprises means for receiving user messages having data and a header relating to one of the applications (17, 18) and means (8) for addressing the data to a respective application according to the header. In an embodiment the user messages are short messages and the data comprises characters in the short message.

10 Claims, 8 Drawing Sheets

U.S. PATENT DOCUMENTS

| | | | | |
|---|---|---|---|---|
| 5,493,105 A | * | 2/1996 | Desai | 235/375 |
| 5,533,097 A | * | 7/1996 | Crane et al. | 340/825.44 |
| 5,544,164 A | | 8/1996 | Baran | 370/352 |
| 5,577,103 A | | 11/1996 | Foti | 455/435 |
| 5,583,918 A | * | 12/1996 | Nakagawa | 455/409 |
| 5,600,312 A | | 2/1997 | Willard et al. | 455/518 |
| 5,628,051 A | | 5/1997 | Salin | 455/466 |
| 5,655,215 A | | 8/1997 | Diachina et al. | 455/466 |
| 5,666,364 A | | 9/1997 | Pierce et al. | 455/466 |
| 5,687,216 A | | 11/1997 | Svensson | 455/412 |
| 5,692,032 A | | 11/1997 | Seppanen et al. | 455/466 |
| 5,710,810 A | * | 1/1998 | Tiilikainen | 379/355 |
| 5,719,918 A | | 2/1998 | Serbetciouglu et al. | 455/466 |
| 5,732,229 A | * | 3/1998 | Dickinson | 395/334 |
| 5,742,905 A | | 4/1998 | Pepe et al. | 455/445 |
| 5,754,775 A | * | 5/1998 | Adamson et al. | 370/261 |
| 5,761,485 A | * | 6/1998 | Munyan | 455/411 |
| 5,764,736 A | * | 6/1998 | Shachar et al. | 379/93.09 |
| 5,794,142 A | | 8/1998 | Vanttila et al. | 455/419 |
| 5,809,115 A | | 9/1998 | Inkinen | 379/93.05 |
| 5,812,953 A | * | 9/1998 | Griffith et al. | 455/550 |
| 5,852,773 A | * | 12/1998 | Hu | 455/403 |
| 5,929,771 A | * | 7/1999 | Gaskill | 455/38.3 |
| 5,930,239 A | * | 7/1999 | Turcotte | 455/466 |
| 5,933,478 A | * | 8/1999 | Ozaki et al. | 379/93.24 |
| 5,949,326 A | * | 9/1999 | Wicks et al. | 340/286.01 |
| 5,982,520 A | * | 11/1999 | Weiser et al. | 359/152 |
| 6,000,000 A | * | 12/1999 | Hawkins et al. | 707/201 |
| 6,018,761 A | * | 1/2000 | Uomini | 709/206 |
| 6,175,741 B1 | * | 1/2001 | Alperovich | 455/458 |
| 6,201,859 B1 | * | 3/2001 | Memhard et al. | 379/93.21 |

* cited by examiner

FIG. 7.

TAMPERE BUS TRAFFIC SMS QUERY
TAMPERE

| SELECT THE BUS LINE, THE TIME OF DEPARTURE FROM THE TERMINAL FOR THE NEXT BUS YOU WANT TO KNOW ABOUT, AND THEN PRESS 'SEND' |
|---|
| GIVE THE TIME, IF YOU WANT TO KNOW THE TIMES OF DEPARTURE OF THE LINES DEPARTING AFTER A SPECIFIED TIME, OTHERWISE SELECT 'NOW' |
| ⦿ LINE 1 Holvasti – Keskustori |
| ○ LINE 1 Härmälä – Keskustori |
| ○ LINE 1 Keskustori – Holvasti |
| ○ LINE 1 Keskustori – Härmälä |
| ○ LINE 2 Keskustori – Rahola |
| ○ LINE 2 Keskustori – Rauhaniemi |
| ○ LINE 2 Rahola – Keskustori |
| ○ LINE 2 Rauhaniemi – Keskustori |
| SEND |

Time selector:
08:00 ⇩
NOW ⇧
05:00
06:00
07:00
08:00
09:00
10:00
11:00
12:00
13:00
14:00
15:00
16:00
17:00
18:00
19:00
20:00
21:00
22:00
23:00 ⇩

COMMUNICATION NETWORK TERMINAL SUPPORTING A PLURALITY OF APPLICATIONS

This application is a continuation of a copending U.S. application Ser. No. 08/804,236 filed on Feb. 20, 1997.

FIELD OF THE INVENTION

The present invention relates to a terminal for a communication network, the terminal being capable of supporting a plurality of applications and having means of communicating user messages. The present invention also concerns a system in a communication network comprising transmitting terminals and receiving terminals being capable of supporting a plurality of applications, both of said terminals having means of communicating user messages.

BACKGROUND OF THE INVENTION

At present, communicators are being developed which, in addition to ordinary mobile station functions, also have data processing facilities, which enable, e.g., the maintenance of a calendar, and the sending of a fax message and electronic mail. The communicators may have or may support several different applications like organiser type devices. One type of communicator has been presented in U.S. Pat. No. 5,422,656, comprising a user interface having a traditional alpha-numeric keyboard-like keyboard with which it is easier to type, e.g., text messages. In the publication in question, the keyboard has been implemented by means of a touch display. However, as traditional mobile phones develop, especially as the user interface and displays develop further, also more advanced operations will be possible by a traditional mobile phone like device.

Publication WO 94/23394 presents an electronic greeting card communication system, comprising an electronic mail server for a communicator having different types of greeting cards, which can be browsed and sent to a similar communicator, for example, by using radio communication. A drawback of the system is that the greeting cards in question can only be sent to a similar communicator. Therefore, the sender should know whether or not the receiver has a communicator supporting the greeting card communication system. In addition, for the implementation of the system, an off-line electronic mail server, for storing different types of greeting cards, should be separately connected to the network for the service in question. Another drawback is that, because the system uses ordinary radio communication to transmit greeting cards, the telephone line of the communicator is engaged during transmission. By means of the communicator, presented in the publication, graphic images including hand written text can be transmitted. The transmission of such an image or a mere hand written message is quite slow due to the large amount of information. Publication WO 94/23394 only discusses the sending of information relating to one application or service, i.e. a greeting card application. As communicator-like devices have several different applications a problem arises of how to send and handle information in relation to different applications. In the WO publication a separate electronic mail server has been arranged for the specific greeting card service. However, providing a separate electronic mail server for each application of a communicator would lead to a rather complicated and expensive solution. And even then one would face the problem of how to handle information relating to different services in the terminal device, e.g. in the communicator.

SUMMARY OF THE INVENTION

The present invention concerns a terminal for a communication network, the terminal capable of supporting a plurality of applications and having means of communicating user messages wherein it comprises means for receiving user messages having data and a header relating to one of said applications and means for addressing the data to a respective application according to said header. Accordingly the terminal may readily have a plurality of different applications on such can be arranged into the terminal at a later stage. The later addition of applications can be done by direct contact of over the air contact to another device. One user message may contain data relating to one application indicated by the header, or a user message could contain data relating to several application, indicated by different headers, e.g. so that the header indicating a specific application is followed by the data relating to that specific application.

User messages contain a limited amount of information and are, therefore, quick to transmit. One type of user message is the so called short message. The invention is especially suitable to be implemented by the use of short messages. The mobile phone system according to the standard IS-136 uses a so called R data field for the transmission of similar short messages. Another type of a user messaging function known in the GSM system according to which SMS like messages can be sent as well is USSD (Unstructured Supplementary Service Data, which is more closely defined in the GSM specifications, e.g. in the following documents: TS GSM 02.04, TS GSM 02.30, TS GSM 02.90, TS GSM 03.38, TS GSM 03.40. A similar messaging form called SOC (Service Operator Code) exists in the mobile phone system according to the standard IS-136. Communication forms like SMS, R data, USSD and SOC are here called user messaging functions and the messages are called user messages despite the fact that such messages can as well be sent by an operator and not only by a user. The benefit with this kind of communication is that it does not reserve the voice call channel either at all or at least not continuously.

Similar benefits exists in packet switched communication. A protocol based on PRMA (Packet Reservation Multiple Access) for relaying packet switched information is known in mobile communication networks. It is also called "Packet Radio". The PRMA is a technology for multiplexing packet formatted digital speech or data into a time divided carrier wave. A packet radio service, GSM GPRS (General Packet Radio Service) under development for the GSM mobile radio system is used as an example. GPRS is a new GSM service offering packet radio service for GSM subscribers. GPRS reserves radio resources only when there is something to transmit, allowing the same resources to be shared by all mobile stations according to their needs. Accordingly also packet radio transmissions may be used for transmitting user messages, that reserve the communication channel for only short periods.

The intention is that any user messages can be used, but in following mainly short messages will be referred to as an example. In addition to being fast to send, the advantages of a short message service can be utilised, such as not reserving the voice channel. Application related information can either be pre-stored in a terminal memory (permanent memory) or a user may store the application related information in a terminal memory (cache memory) by contacting a server by means of a terminal. Depending on the application, the user may enter user input or modify the information in the applications. In another application the information relating to an application may be sent by a service provider and the information may be such that it is not possible for the user to modify it, only to request the service provider to modify it. The information readily printed in the application can also be transmitted. An application type identifier or header is preferably added to the transmission, so that a receiving terminal identifies the short message as not an ordinary short message, but as a short message containing information relating to and intended for a specific application. The identifier can be a code in an address or a control field of the short message, or it can be a code in the message part of the short message. Because it has been realised that the short message service, already existing in the mobile station system, can be utilised for sending information on applications, the advantages are, e.g., that there is no need to establish an off-line server for sending the application related information, such as, for example, in the system presented in Publication WO 94/23394. Especially advantageous is that one and the same server, i.e. the SMS server (the Short Message Service Centre SM-SC) can be used for sending and forwarding information relating to any application, so there is no need to have separate servers for each application. The SMS server will forward any short message and the terminal will address the information to the correct application according to the header or identifier in the message. And since a short message can be sent simultaneously with a circuit-coupled connection, the sending of the application related information does not engage the terminal's communication line, e.g., in case of a simultaneously incoming call. A network like the GSM network is maintained by several operators and usually each operator has at least one SMS server of their own. In this case naturally any SMS server or several servers may be used for the invention.

A terminal according to the present invention is wherein it comprises means for receiving user messages having data and a header relating to one of said applications and means for addressing the data to a respective application according to said header. Another terminal according to the present invention is wherein it comprises means for sending data relating to one of said applications in a user message and means for adding a header to the user message, the header indicating the respective application that the data relates to. Correspondingly, a system according to the present invention is wherein the transmitting terminals comprise means for sending data relating to one of said applications in a user message and means for adding a header to the user message, the header indicating the respective application that the data relates to, and the receiving terminals comprise means for receiving user messages having data and a header relating to one of said applications and means for addressing the data to a respective application according to said header.

BRIEF DESCRIPTION OF THE DRAWINGS

The invention will be discussed below in detail by referring to the enclosed drawings and appendices, in which FIG. 7 illustrates another application.

DETAILED DESCRIPTION

In following the invention will be explained in more detail by using as an example one form of user message function, the short message service. For understanding the invention prior art relating to short messages will first be described by referring to FIGS. 1–5, and the embodiments of the present invention will be explained by referring to FIGS. 6–11, and to Appendix 1.

In digital mobile communications systems, as in the GSM system, it is possible to send so-called short messages. In the GSM system, this is known as the SMS (Short Message Service). Thus, in addition to telephone calls and data transfer, the GSM system also provides, in the form of a short message service, a paging system-like service. However, the short message service known from the GSM system is considerably more advanced than an ordinary paging system. By means of a mobile station, text messages can be both received from and transmitted to another mobile station. One of the advantages of the short message service of the GSM system is also that the short message can be sent or received at the same time as an ordinary circuit-coupled communication is open, e.g., during a call. Thus, the sending of a short message does not keep the mobile station engaged in case of a possible incoming call.

Figure 1:
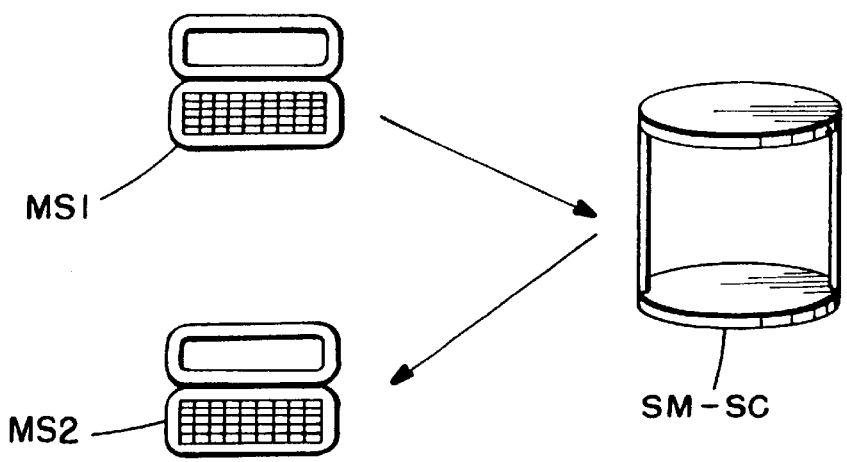
FIG. 1 illustrates the flow of a short message from one mobile station to another.
Figure 2:
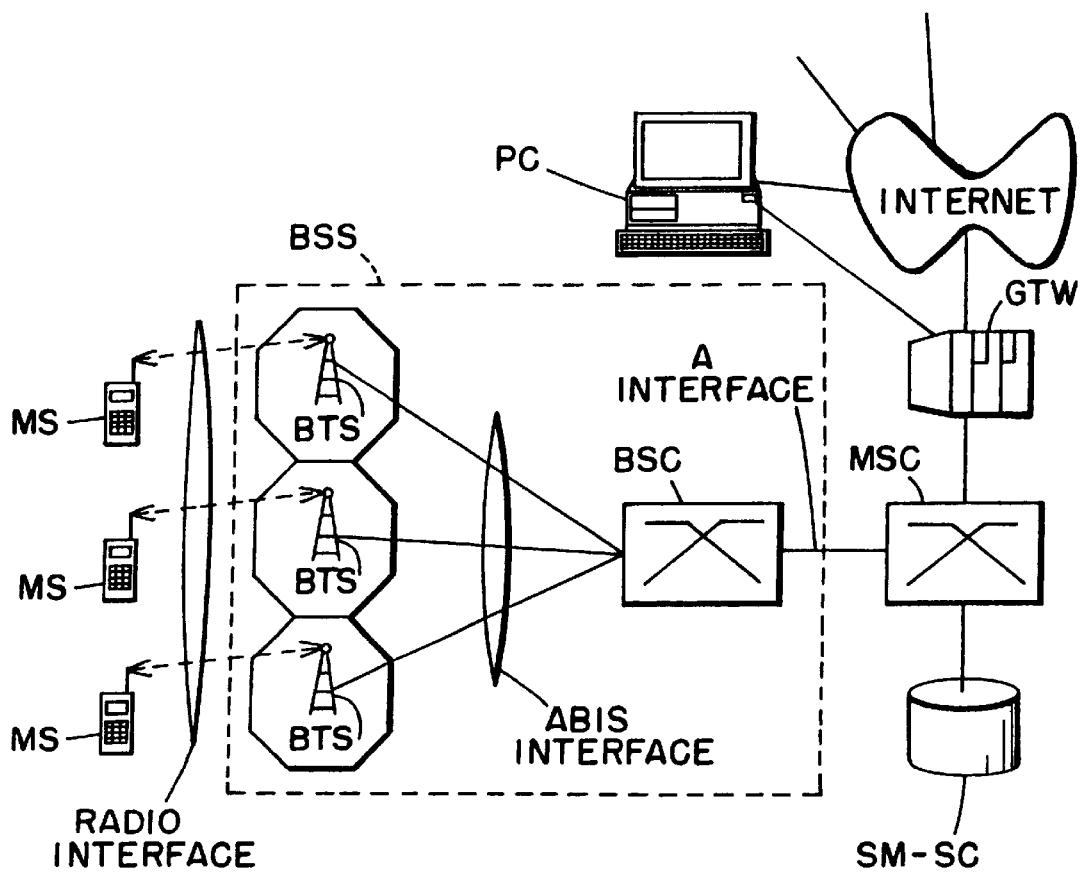
FIG. 2 illustrates connections of a mobile station system to a short message service centre.

The advantage of short messages as compared to telephone calls is that they can be sent to a receiver although the receiver cannot be contacted at the time the message is being transmitted. This has been implemented by dividing the transmission of the short message, from a first mobile station to a second mobile station, into two parts as illustrated in FIG. 1: from a transmitting mobile station MS1 to a SM-SC (Short Message Service Centre), wherein the short message is stored and sent further to the actual destination, i.e., to a receiving mobile station MS2, as soon as contacted. In FIG. 2, the connection of the short message service centre SM-SC to a mobile station system has been illustrated in more detail. Below, the transmission and flow of short messages between different interfaces, known for prior art, will be discussed by referring to FIGS. 1–5.

The structure of a mobile station system and connections for transmitting short messages are illustrated in FIG. 2. Mobile stations MS are connected to base stations BTS by means of radio communication. The base stations BTS are further connected, through a so-called Abis interface, to a base station controller BSC, which controls and manages several base stations. The entity formed by a number of base stations BTS (typically, by a few dozen base stations) and a single base station controller BSC, controlling the base stations, is called a base station system BSS. Particularly, the base station controller BSC manages radio communication channels and handovers. On the other hand, the base station controller BSC is connected, through a so-called A interface, to a mobile services switching centre MSC, which co-ordinates the formation of connections both from and to mobile stations. A further connection is made, through the mobile service switching centre MSC, to outside the mobile communications network. The aforementioned short message service centre SM-SC is coupled to the mobile services switching centre MSC.

When a user wants to send a short message by means of the mobile station MS1 (FIG. 1), he/she writes a message to be transmitted (using a user interface of the mobile station) and gives the phone number of the mobile station MS2, i.e., an identifier of the mobile station MS2, whereto the message is going to be transmitted. In addition, the mobile station should have the contact information, i.e., the phone number of the short message service centre SM-SC. Normally, this has been stored in the memory of the mobile station, in which case it is not necessary to separately input the phone number in connection with the sending of each short message. Thus, when sending a short message, the message goes from the mobile station MS to the base station BTS, and from there, through the base station controller BSC and the mobile services switching centre MSC, further to the short message service centre SM-SC. The short message is stored at the short message service centre SM-SC, wherefrom it will be sent further to the receiving mobile station MS2, in which case the route of the message is the same as in transmission, but in the opposite direction. The short message service centre SM-SC will be informed whether or not the mobile station MS2 has received the short message. Thus, it can re-send the short message, if the mobile station MS2 has not received it for some reason.

Additionally short messages may be sent by a personal computer PC. In this case the mobile services switching centre MSC has a connection to a server GTW (Gateway), which has a connection to e.g. Internet. Thus a computer PC having a connection to Internet (or directly to the server GTW as shown by the broken line) may fetch a WWW (World Wide Web) page from Internet, which physically can be found e.g. from the server GTW. Optionally a service provider or operator may have a separate server GTW having a connection to the mobile services switching centre MSC for sending short messages or other user messages. When using such a WWW page for sending a short message the user inputs the connection information (e.g. phone number) of the receiving terminal MS2 and the message to be sent, whereby the message is transferred via Internet and the server GTW to the mobile services switching centre MSC and further to the short message service centre SM-SC from which the message is directed to the receiving terminal MS2 via the mobile network.

Figure 3:
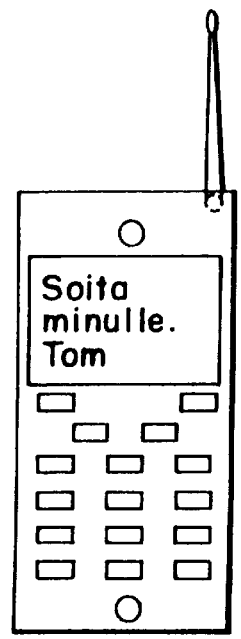
FIG. 3 illustrates a user interface of an ordinary mobile phone.

By means of the short message service SMS of the GSM system, it is possible to send, at a time, a message the maximum length of which is 160 characters. The characters are seven-bit ASCII (American National Standard Code for Information Interchange) characters and, therefore, the maximum length of a message in bits is 1,120 bits, i.e., 140 bytes. Ordinary mobile stations, as the one illustrated in FIG. 3, have a small display and an advanced keyboard by means of which it is possible to write short messages, i.e., input different types of alpha-numeric characters. The received message is displayed on the display of the mobile station, which enables the display of alpha-numeric characters, as illustrated in FIG. 3.

Figure 4A:
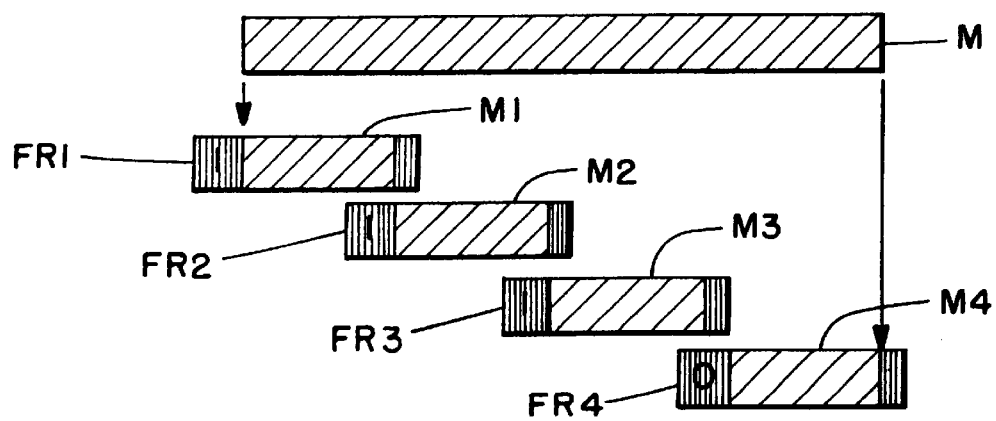
FIG. 4*a* illustrates segmenting of a message into frames in transmission.
Figure 4B:
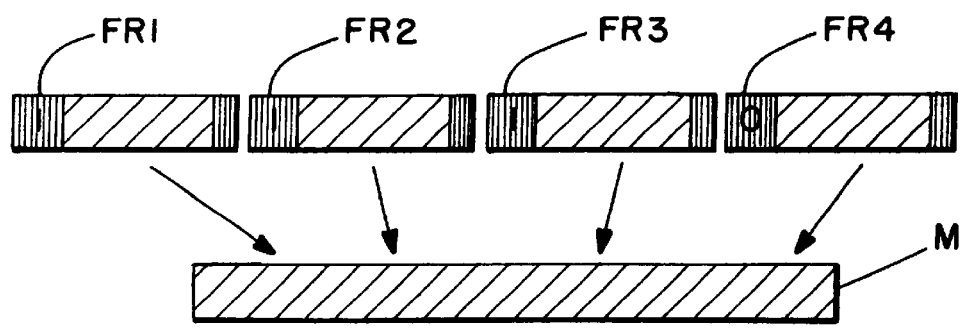
FIG. 4*b* illustrates reconstruction of a message in reception.
Figure 5:
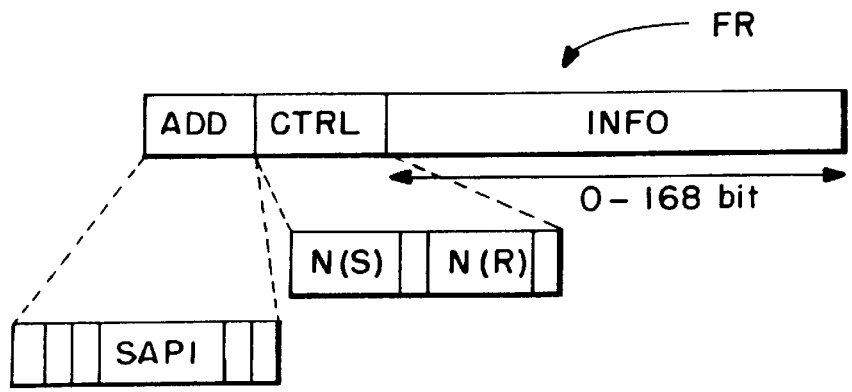
FIG. 5 illustrates a frame of a short message.

As is well known, transmissions in the GSM system have been divided. into frames. When the length of a message to be transmitted exceeds the permissible maximum length of a frame FR, the message M must be segmented into parts M1–M4, and sent in several frames FR1–FR4, as illustrated in FIG. 4a. In reception, the mobile station reconstructs the message M, divided into several frames FR1–FR4, as illustrated in FIG. 4b. At a radio interface (FIG. 2), the maximum length of a frame is normally 168 or 184 bits and, therefore, a short message, the maximum length of which is 1,120 bits, must be segmented into several frames. FIG. 5 illustrates a frame, a so-called LAPDm frame (Link Access Protocol for the Dm channel), to be transmitted at a radio interface, which has normally been divided into three fields. The first field is an address field ADD, which contains the address of the destination of the message (i.e., a receiving mobile station identifier), given in several bytes. In the GSM system, signalling messages are also transmitted within corresponding LAPDm frames. In radio communication, there can simultaneously be two message flows independent of each other: signalling messages and short messages. These two different flows are separated from each other by means of a service access point identifier SAPI to be added to the address field ADD. Its value can be 3, indicating signalling, or 0, indicating a short message. The second field is a control field CTRL, which contains the sending frame and receiving frame numbers N(S) and N(F). The third field is a data field INFO, containing the actual information or data, which contains a maximum of 168 bits of information, i.e., the contents of the actual short message.

In the present invention, using short messages as an example, the transmission of each application related information will be identified by means of a specific code, i.e., an identifier, which enables the receiving terminal to process the received message directly into an application, as specified, containing the received data. The identifier is preferably implemented by using ASCII characters in an information field of the short message transmission frame, i.e., in a field INFO (FIG. 5), which contains the actual short message in characters. Alternatively the identifier may be in the form of some other character or string code, such as bits, since for sending a short message the data is anyway converted into bits. Because the information relating to the applications is transmitted in a short message, it can also be received by means of an ordinary mobile station, which does not support the application service, but is capable of transmitting and/or receiving short messages. By placing the application identifier in the field INFO, there is also the advantage that in an ordinary mobile station, which does not support this type of application service, but is capable of transmitting and/or receiving short messages, the application identifier is displayed to a user of the terminal, e.g. a communicator and, hence, the user notices not having received an ordinary short message, but the information relating to a specific application. In addition, a user of this type of ordinary mobile station can also transmit a message, such as mentioned above, by first writing, on the message, the identifier of the application in question in characters, and the rest of the information correctly divided. The reception of such a transmission by means of a terminal, according to the present invention, will produce a fully received application related information record.

Alternatively, the application identifier is formed as a specific bit code in the address or information field of the short message (see FIG. 5). Furthermore, in this case, an ordinary mobile station can receive the transmitted information relating to the specific application, but the user cannot see, in connection with the message, that the received message is the information for a specific application. In this case, the information for this type of application cannot be sent by means of an ordinary mobile station, unless it is modified, so that by entering a specific command, it will add the aforementioned bit code because, otherwise, the ordinary mobile station is unable to inform of the application identifier.

Figure 6:
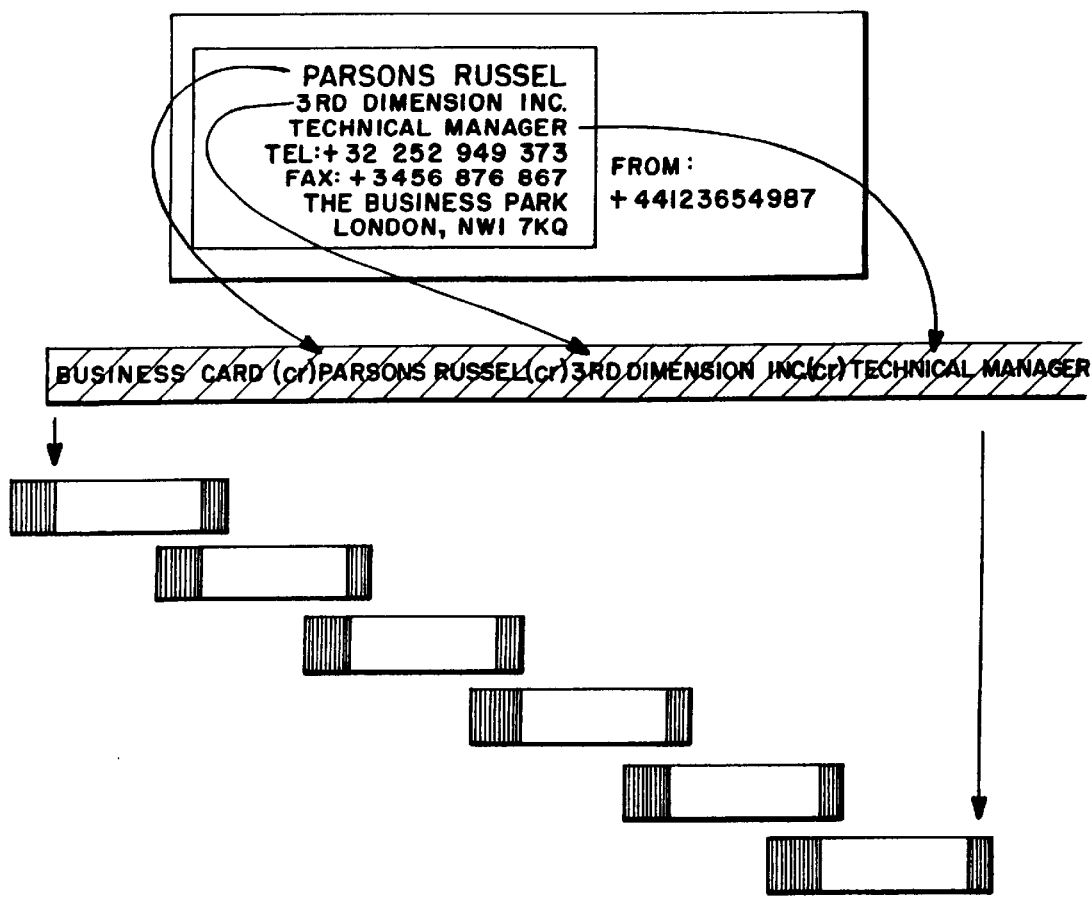
FIG. 6 illustrates one application according to the present invention.

FIG. 6 illustrates an example of an application with an application record pre-stored in a terminal, the user input information (the application record) on which can be sent to another terminal as a short message. This application type is a so-called "Business Card". The application runs business card contents and contains the following information: name, position, company, contact information, etc. Each information can be in its own field or the application may only have one field, whereinto all the information is fed. FIG. 6 also illustrates the transmission of the information on an application as a short message. In this case, an identifier of the application type may be, e.g., 'BC' or 'Business Card' as illustrated in the figure. A terminal, according to the present invention, adds the application identifier (e.g. as letters or in other form) to the beginning of the information field of the short message to be transmitted first. The contents of the different fields ends automatically in a line feed character. On the basis of this character, a receiving terminal is capable of dividing the received information into the corresponding fields on the application. If this type of message was transmitted as a short message from an ordinary mobile station, a user would write, at the beginning of the message, an application identifier, i.e., in the case of FIG. 6, 'Business Card', after that a line feed character [cr], then the information on the application in succession or by field (depending on the application specification), i.e., first the information in the name field and a line feed character, etc. A received 'Business Card' can be stored in a memory of the terminal, where business cards can thus be stored in an electronic form and can be retrieved from the memory and looked at by means of the Business Card application. The information in a Business Card application may of course vary depending on the device. In some terminals it could mean e.g. only the name and phone number, which can be used as a Short Dial application. Accordingly the invention could be used to update contents of a Short Dial application. In this way the user could make a backup of the contents of the Short Dial application by sending the contents to a service center for storage. If the terminal (e.g. a mobile phone) is later lost/stolen or destroyed in which case the user will have to acquire a new terminal, he/she can in addition to activating the terminal, also download (retrieve) all Short Dial application contents to the terminal. Of course the same solution can be used for the contents of any application in the terminal. Several other applications will be explained here.

In the following, as an example, other types of applications will be discussed. These applications can be pre-stored in a terminal or arranged into the terminal (by programming) at a later stage.

An application "Call Me Back" may contain a person's name, telephone number, address, etc., as well as a message that the person should call back. This information can be divided into separate fields or be in the same field, as presented above. The aforementioned message to call back may be inseparably linked to the "Call Me Back" application and/or "Call Me Back" (as text) can be written as an identifier, which will also be displayed on the display of an ordinary mobile station, in which case, a user of the mobile station in question receiving the message will see that it is a request to call back. The transmission of the "Call Me Back" application related information can be connected to an outgoing call, so that if the destination terminal does not respond, the transmitting or calling terminal will ask the user (the caller) whether a "Call Me Back" notifier should be sent, in which case, if the user's response is positive, it will run the application in question on the display with the telephone number of the caller (which it can access, e.g., from one's own SIM card, Subscriber Identity Module) ready input on the application data fields. The user may input the rest of the information and modify it on the display by the "Call Me Back" application. When application related information is sent as a short message, the terminal automatically offers the telephone number of the receiver as the destination of the message, which it can pick up from the information of the call left unanswered.

An identifier of an application 'Meeting Proposal' can be 'Meeting Proposal', and the information in the application may contain a convenor's name, time and place of the meeting, as well as its subject. If, in a terminal, there is also an electronic calendar application, the transmission of the application related information in question can be connected to the functioning of the calendar application so that, as a response to the transmission of information related to this type of application (Meeting Proposal), a reservation for the meeting at the time in question is made in the calendar. The specific application preferably picks up the time of the meeting from the application and enters, in the calendar, at the time in question, the rest of the information on the application, such as the place and subject of the meeting, as well as the name of the convenor. Correspondingly, when receiving this type of application related information, the terminal automatically searches, in the calendar, for a statement of what may already have been agreed upon at the time in question (if entered in the calendar). Thus, the receiver can quickly decide whether to answer 'Yes' or 'No' to the meeting proposal. When such an answer is sent, the terminal establishes an application 'Meeting Proposal Answer', whose identifier can be, e.g., 'Meeting Proposal Answer', and the information in the application may include a receiver's name, a time and place of the meeting, subject, answer (Yes/No), and comments. In this case, the calendar application in the terminal of the receiver, i.e., the sender of the meeting proposal, is preferably arranged, so that it either confirms or cancels the reservation made in the calendar.

Furthermore, as a continuation for the 'Meeting Proposal' application, there may be, in the terminal, an application 'Meeting Confirmation', whose identifier is, e.g., 'Meeting Confirmation', and the information in the application may contain a convenor's name, a time and place of the meeting, and its subject. The terminal preferably offers to send this application related information automatically to all those who answered 'Yes' to the meeting proposal. In this case, the mobile stations or communicators receiving the information related to this application will confirm the reservation in question in the calendar.

Correspondingly, in the same way as with the 'Meeting Proposal' application, other similar applications can be arranged in the terminal, e.g., an application 'Free Time Query', whose identifier can be, e.g., 'Free Time Query', and the information in the application may contain a sender's name, a time, a place, and a subject, which a user may freely fill in, e.g., tennis, dinner, etc.

The terminal preferably functions in this connection in the corresponding way, both in transmission and reception, as in connection with the meeting proposal applications, i.e., it makes a reservation in the calendar, enables the response to a query by means of another application, and, furthermore, enters in the calendar a possible confirmation or cancellation.

By means of an application 'Service DTMF Commands', information can be received, e.g., from a network operator in order to utilise services provided by the operator. An application identifier can be 'Service DTMF Commands', and it may have fields for a sender's name, a DTMF command, and an explanation field. The command can be, e.g., a password, a user identifier, or something else related to the services provided by the operator. A user may use the received command, e.g., a password, when utilising the offered services, in which case, the user does not have to input the password through the keyboard, because the password can be obtained directly from the application (or the information in the application) in question. Other applications to which information may be received from a network operator are any applications which require some settings in the terminal before an application can be used. An example is an 'Internet Access Point' application which contains information necessary for the terminal to use a WWW browser for example. This information may be provider name, phone number, modem initialisation information, server information, IP address (Internet Protocol). Another example of an application that needs some settings is a Fax Box application. A faxbox is a service implemented e.g. in a server, which receives all faxes for a specific user. The user can then retrieve the faxes from the faxbox. For retrieving faxes the terminal needs to have the contact information to the server. This could be implemented so that when the terminal has received a new fax to the faxbox, the terminal receives a notification in a user message of a received fax, but additionally the user message would include a UID information (Unique Identifier), i.e. contact information to the faxbox server and other necessary information, such as filename of the fax and a password needed. The Fax Box application could function either manually, i.e. by user execution, or automatically so that the terminal contacts the faxbox server automatically for retrieving a received fax according to the identifier information contained in the notifying user message. The contact can be made as fax call to retrieve the fax. Optionally it could be a user message sending the identifier information back to the server and additionally the fax connection number of the terminal so that the server then can contact the terminal for sending the received fax to it via a fax call.

Another surrounding for use of the invention is for solutions relating to intelligent traffic systems, which use mobile station like devices as terminals. The terminal according to the invention may thereby have different traffic related applications. One example is a 'Position' application with which position requests and responses may be sent/received in user messages according to the present invention. Different solutions exist for determining the position. The application "Position" may contain position information of a specific address or point of interest as well as the description of the corresponding position, a flag describing the reason or mode of transmission, and a reference number in case of a response message. After dividing the received information into the corresponding fields, the receiving terminal stores the received 'Position' application record in a local memory. The terminal can also send its own position or a stored position information in a user message to another terminal or to a server. This can also be done automatically, e.g. in case of emergency situations. For emergency situations the terminal may have separate "Emergency Indication" or "Panic Indication" applications which automatically include information about the sender, which the sender may modify in the application, about his vehicle and his position and other relevant information needed for emergency situations.

Additional applications for traffic purpose is for example "Trip Request" and "Trip Response" applications (or generally "Travel" application), which is a travel assistance application. In this application the terminal can send out a Trip Request, preferably containing the actual position of the terminal as a starting point and a selected position out of the stored position application records for the destination of the trip. As a response to a Trip Request the terminal may receive 'Trip Response' messages, which may contain instructions for the trip, such as turn instructions or public transport connections.

Also the terminal may have a Service application with information that can be important for service purpose such as the original serial number of the terminal, manufacturing month, repair month and month when modifications have been done (e.g. modifications to software). The information in the Service application can be sent in a user message from the terminal to for example the operator or a service station.

Another possible application is a Phone Book application for sending phone number queries to a service provider keeping a Phone Book service. The query may include information like name, city of residence, landline/mobile number etc. As a response the service provider sends a user message which has the phone number or numbers and for example the information that the user sent originally.

Another type of application which will provide the terminal with many possibilities for having additional services and applications is a "Menu" application, in which the terminal includes an application which is capable of creating menus in the terminal according to a received user message. The menus are preferably stored in a permanent memory, such as memory 14 in FIG. 9 in order to create menus, which can be used permanently in the terminal. The user message contains information according to which the "Menu" application creates or updates menus in the terminal. This allows access to a big variety of services, which the operator can update in the user's terminal over the air, i.e. without the need for the user to take the terminal to a service place. Operators are provided with a very powerful tool to personalize the handsets their subscribers use. This tool is operator specific menu structure in the handset which can be different from subscriber to subscriber, if needed to. The menu structure can be dynamically updated over the air without any user assistance. In following is an example of menus that can be created and updated and which thereby can provide the user with additional services accessible by activating the command in a menu. Originally the terminal may include some basic menus or no menus at all. All the menus and sub-menus shown in the following example can be crated by sending a user message relating to the Menu application.

MENU:
  Phone Settings
  Operator Services
    Call Customer Service
    Download Ringing Tones
      Rock around the clock
      Those were the days
      Smoke on the water
    Download SIM Software
    New Offerings
    <any operator specific supplemental service>
  Local Services
    Join Wal Mart direct-ad
    Traffic at Dallas I-75
    Thunderstorm Warning!

Personal Services
  BigBook
  Yellow Pages
  Stock NOK A
  US Weather
  Send eMail
  Find Restaurant
  Holiday Travel Inc.
Memory Settings Accordingly the menu or menus can include main-menus and sub-menus as shown above, where the main menus Operator Services, Local Services and Personal Services include sub-menus. These sub-menus may further be divided into sub-menus, e.g. sub-menu Download Ringing Tones can be divided into sub-menus according to ring tone melodies (Rock around the clock, Those were the days, Smoke on the water) which can then be chosen as ring tones by selecting the specific sub-menu and activating it as a command. The command is sent to the service provider as a user message according to the invention and as a response to the user message the operator may send the ring tone coded into a user message which can then be stored into a ring tone memory of the terminal.

Selections made in sub-menus cause wide variety of actions. Entries in the sub-menus can be associated with URL (Uniform Resource Locater) information, which can be used to fetch information from Internet, send email to Internet recipients, etc. In addition, supplementary services can be initiated directly from these entries; a special form of URL can be used to convey supplementary service related information or a call or user message. Actions may cause information to be sent to the terminal by a network entity, e.g. enables selection and then downloading of ringing tones as explained above. Thereby the Operator Services menu can cause information to be fetched from Internet based on URL information, it can cause email message to be sent to a recipient, it can cause operator specific supplementary service strings to be sent to the network, or it can cause call initiation. The Local Services menu support services that are targeted to a specific geographical area. A menu is generated from 'volatile' services that are available in a certain area, at a certain time. The users can browse through these services, and pick those that interest them. This facility provides an easy way to direct information (or advertisements of services) to phone users traveling through or in a geographical area. For example, one of the services, "Traffic at Dallas I -75" could become available as the phone user approaches the Interstate highway 75 in Dallas area. Instant traffic information can be achieved by selecting the service from the menu. The Personal Services menu can be compared to the bookmark list in a normal WWW browser (World Wide Web). The phone users have the ability to add items to the list, to edit them, and to remove them. The Personal Services menu enables users to easily initiate wide variety of services. Service information can be moved from the list of operator specific or local services to the personal service list. Again, Personal Services menu can cause information to be fetched from the Internet based on URL information, it can cause email message to be sent to a recipient, or it can cause operator specific supplementary service strings to be sent to the network or it can execute a call or cause a user message to be sent. For example the sub-menu command US Weather will result in the terminal receiving information on the weather in the United States.

Menu creation will be explained in more detailed in following. Menu creation is controlled and implemented by a processor and the Menu application which is stored in a memory and run by the processor. In following a protocol is explained according to which the Menu application may be implemented as software run by a processor. The terminal will be described in more detail later in relation to FIG. 9.

The protocol defines predetermined commands according to which creation and change of menus and menu structures are controlled. There are four Item primitives in the protocol which are add, remove, list, and item capability. These item primitives will be accompanied by other menu-item definitions as will be explained.

The first primitive item is item-add, which adds a menu or sub-menu. The command sequence may include following definitions, which can be sent to the terminal in a user message:

<item-add>menu-item-token
  menu-group-name
  menu-item-name
  menu-item-type
  menu-item-help
  menu-action-list The definition menu-item-token can be an optional command to be used by the server for authorization purposes if security is needed, if not then it can be omitted. Once a menu item has been sent to a terminal with a menu-item-token set, no command can be given to change or remove the existing menu-item without the same menu-item-token. This kind of authorization feature can be used in connection to other applications described here as well, not just in relation to the Menu application. For example a ring tone would be updated only if it is accompanied by the correct authorization word or code, like the menu-item-token. The definition menu-group-name specifies the menu group into which the menu item with name menu-item-name is put. If a menu item with the same name in the same group already exists (and the server is authorized to update the menu item by the correct menu-item-token), then the existing menu-item is replaced with the new one. The name of the menu group is placed in apostrophes in context with the definition.

The definition menu-item-name defines sub-menu names or commands under the menu group (or main menu). Likewise the name of the sub-menu is placed in apostrophes in context with the definition.

Both menu-group-name and menu-item-name have a reserved character of ':' which has a special meaning of line-feed inside the menu group name, i.e., the name "phone:settings" menu item name will show on a terminal as 'phone' on the first line, and 'settings' on the second line. Additionally menu-group-name has a reserved character of ';' which has a special meaning of indicating change of hierarchy level in multiple hierarchy menus.

Menu-item-type indicates what is the type of the menu item. The menu item can have the following types the explanation of which is below: normal, volatile, selected (volatile), and link Normal menu items are stored in the handset normally.
  Volatile menu items are one-of-menu selection items for multiple choice menu items.
  Selected (volatile) menu item indicated the currently active volatile menu item.
  Link menu items indicate to the terminal that it must request the volatile selection items from the server.

The definition menu-item-help is a text string which is shown when the user of the handset needs help regarding the current menu item. It is handset specific does the handset automatically show the help text when for example an idle timer expires. Similar additional definitions may be tied with menu-item-help as was described above for menu-group-name and menu-item-name.

The definition menu-action-list is a list of actions which can be activated from the menu. The actions can be for example of the type action-send-message or action-call-control. Action-send-message causes a user message to be sent in one of many methods. The method is dependent on message type, which can be any user message as has been specified earlier (SMS, USSD, R data, SOC, Packet Radio). Action-call-control causes a call to be made in one of many methods. The method is dependent on call-control-type, which can be voice call, data call, fax call, or ss ( a supplementary service string is sent to the network).

The second primitive item command, item-remove, causes a menu item identified by menu-group-name and menu-item-name) to be removed from the terminal provided that authorization (based on menu-item-token or on an authorization list) does not fail. The command sequence can be following:

<item-remove>menu-item-token menu-group-name menu-item-name

The third primitive item command, item-list, causes the terminal to send a list of menu-item-names to the server from which this command was originally sent. The server can specify the menu for which the list of items is requested. When menu-item-token is given, only those items with matching token will be returned. The command sequence can be following:

<item-list>menu-item-token menu-group-name

The fourth primitive item command, item-capability, can be used to add or to remove extra capabilities from a menu item. This command can be used e.g. to add an icon to a menu item according to the specified capability. The command sequence can be following:

<item-capability>menu-item-token menu-group-name menu-item-name menu-item-capability Authorisation to change menus may defined more closely by authorisation primitives. There are three authorization primitives which are add, remove, and list. Authorization lists may especially be used for operator and manufacturer menus. It is implementation specific how many entries the terminal is capable of storing in the authorization list of each menu. The authorization primitives and commands for entering them into the terminal can be implemented in a similar manner as was described above for menu-item primitives. The authorization commands are privileged in such sense that they will be accepted only for a menu with authorization list active, and when sent from an already authorized server.

The first primitive authorization command, authorization-add, can be used to add one or more new authorized servers to the list of authorized servers for the given menu (menu-group-name). The menu-authorization-server-list comprises one or more lines of information, each defining one authorized server. For GSM/SMS, an authorized server is defined by a pair defining identity of the short message service centre and of the server, e.g. (MS-ISDN of a SMSC which is the mobile subscriber international ISDN number for the SM-SC; MS-ISDN of the server, which is the mobile subscriber international ISDN number for the authorized server). The command sequence can be following:

<authorization-add>menu-group-name menu-authorization-server-list

The second primitive authorization command, authorization-remove, can be used to remove one or more authorized servers from the list of authorized servers for the given menu (menu-group-name). The command sequence can be following:

<authorization-remove>menu-group-name menu-authorization-server-list

The third primitive authorization command, authorization-list, can be used to request the handset to send the list of privileged servers for a requested menu (menu-group-name). The availability of this command depends on the handset implementation. The command sequence can be following:

<authorization-list>menu-group-name

The Menu application has stored the meanings of different commands. This may be done for example in the form of a script interpreter as software in the terminal. An example of script interpreters is an interpreter understanding a specific programming language. Accordingly, when a specific command or sequence of commands is received in a user message according to the invention, the Menu application implements operations accordingly, such as adding or removing menus and/or sub-menus. The above are to be treated as examples. Naturally different commands may be used than the above, and they may be shorter in order to fit more commands into one user message (e.g. into a short message).

When using the Menu application with short messages the number of one or several short message service centres (SM-SC) can be related to a menu so that when activating a user message by a menu item the message would be sent via a specific short message service centre or to any SM-SC of a specific list. The numbers of a specific or different SM-SCs can be sent from the network to the terminal in a user message, e.g. when a menu is created or updated. This would allow more possibilities for services and quicker and more reliable transmission of user messages, when a special service (or the server providing that service) accessible via a specific menu command is connected to a specific service centre.

Figure 10:
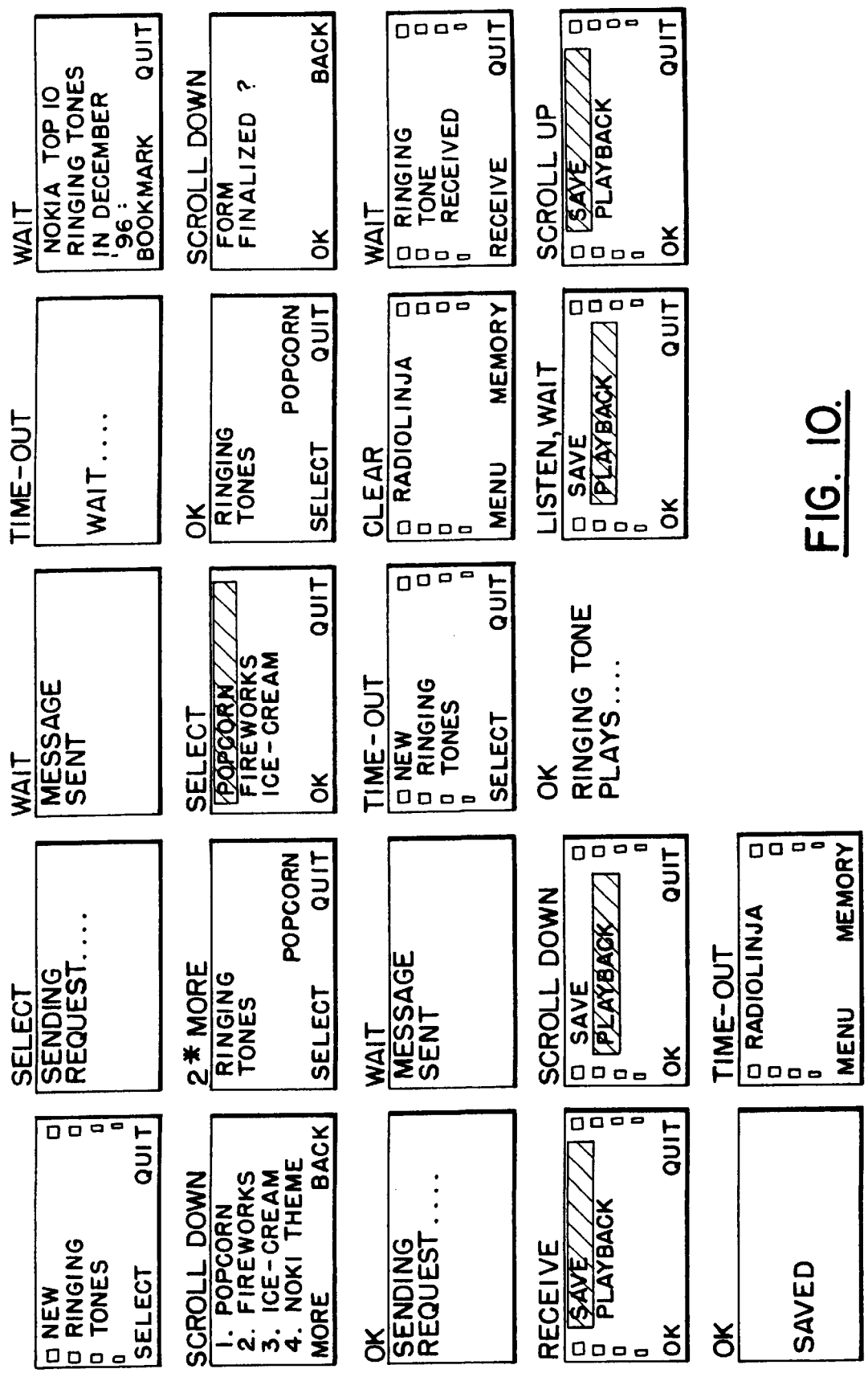
FIG. 10 illustrates in sequence the function of one application in the terminal according to the invention.

An example of creating a menu for ringing tones is disclosed in FIG. 10 as a sequence of displays to illustrate what the user sees on the display. The command "NEW RINGING TONES" is sent in a user message to a server of a ringing tone service provider in order to request for latest ringing tones. As a response the server sends a user message containing information relating to the Menu applications for creating a menu, from which the user can select a new ringing tone. The user selects the desirable ringing tone from the menu (selects ring tone 'Popcorn'). The selection activates a user message to be sent to the server indicating the desired ring tone. After a while the terminal receives the ring tone from the server. A received ringing tone is indicated to the user using the "RINGING TONE RECEIVED" notification. The user can accept or reject the ring tone. Once the user has given acceptance, the selection menu with the options "Save" and "Playback" displays. If the user selects the Save-option the received ringing tone is saved to the phone and it appears to a ringing tone options menu. The saving is indicated to the user by displaying a "SAVED" confirmation note after which the phone goes to the idle state. If the user selects the Playback-option the received ringing tone is played to the user and after that the original selection list displays again. If the user gives a rejection of the new ring tone, the received ringing tone is discarded, the selection list is removed from the screen, and the phone goes to the idle state.

Figure 11:
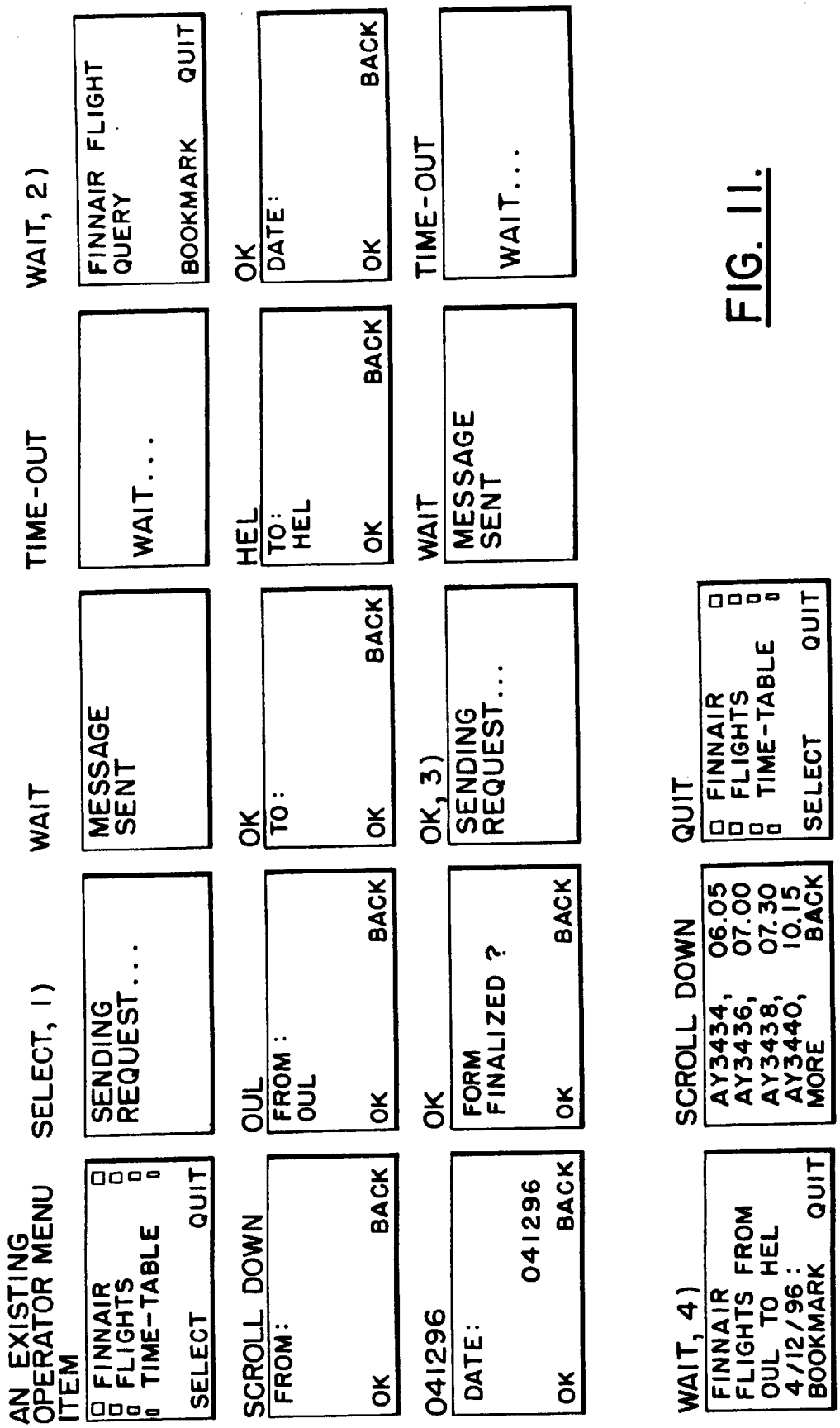
FIG. 11 illustrates in sequence the function of one application in the terminal according to the invention, and Appendix 1 illustrates the application related information, illustrated in FIG. 7, presented in characters.

Another example of application of commands producing functions in a terminal will be described in following with reference to FIG. 11. The example relates to querying the timetable of certain flights. First it is assumed that the user already has a created menu command for this purpose in the terminal, which command the terminal may have received according to the invention. The menu item FINNAIR FLIGHTS TIME-TABLE includes readily the contact information of the server to which the request is to be sent or if the terminal has a specific contact, then the request will be forwarded from that contact to the server with the service to be requested, i.e. the flight schedules. By activating the menu item FINNAIR FLIGHTS TIME-TABLE a first user message includes a code or signs which indicate sending a request, e.g.

1) The first sent user message is following:
   ??? FLIGHTS
   where "??? FLIGHTS" is a command indicating to the receiving server that it is a request for Finnair flight time-tables. The user does not see the contents of the message but rather sees notes on the displays indicating that the request is being sent, that it has been sent and that the user shall wait for a while until a reply comes. These notes are shown after step 1) in FIG. 11. After this the terminal receives a user message from the service provider, e.g.

2) The first received user message is following:
   ++Finnair flight queryCR
   <From:CR
   <To:CR
   <+Date: CR
   where ++ indicates to the terminal to wait for a reply and the text after that is displayed on the terminal screen for a while and CR (Carriage Return) ends the command row. The sign '<' indicates a letter entry mode so the text after the '<' sign is displayed on the terminal screen as seen in FIG. 11 and it allows the user to enter letters. In this example OUL is entered indicating that the request concerns a flight from the city of Oulu. The user ends the entering by a predetermined command (e.g. pressing of a specific key). Similarly a next entry mode indicating destination is showed on the display, whereby the user enters HEL entered indicating that the request concerns a flight to the city of Helsinki. The sign '<+' indicates a number entry mode so the text after the sign is displayed on the terminal screen as seen in FIG. 11 and it allows the user to enter numbers, which in this case is the date of the requested flight. When the last command is reached the terminal asks if the form is finalised and if the request can be sent, and if so the terminal creates and sends a second user message containing the entered information, e.g.

3) The second sent user message is following:
   ++Finnair flight queryCR
   <From:OULCR
   <To:HELCR
   <+Date: 041296CR
   which the service provider (server) is able to interpret according to the predetermined commands. Again the user does not see the contents of the user message, but is displayed predetermined notes on the terminal screen. As a response to this request the terminal receives a second received user message from the service provider, e.g.

4) The second received user message is following:
   Finnair flights from OUL to HEL Apr. 12, 1996:CRAY3434, 06:05 AY3436, 07:00 AY3438, 07:30 AY3440, 10:15 whereby the terminal displays the relevant information (not the application specific codes) to the user as shown in FIG. 11 allowing the user to scroll through the information (e.g. with arrow keys or other scrolling means) and as a response to a quit command from the user interface, returns to showing the original menu command.

The example described above and shown in FIG. 11 illustrates how user messages according to the invention can be used for providing new services to a terminal, like a mobile phone, by having predetermined signs corresponding to predetermined commands. These signs and commands can be stored in a memory in the terminal device of a user (e.g. a mobile phone) or of a service provider (e.g. a computer) and can be implemented by software run by a processor for performing the predetermined commands. Also in this way the terminal can be programmed to function in a specific manner. The Menu application allows to introduce new applications into the terminal. For example the previously mentioned Phone Book application could be introduced to the terminal by a first user message from the service provider creating a first menu (e.g. menu 'Phone Book') after which when sending a request to the service provider the terminal would first receive a menu structure for sending the information needed to get the relevant phone number as was described earlier and after sending the relevant information the terminal would receive a response including the phone number. This procedure could be similar to what was described above in connection to FIG. 10 for querying the timetable for a flight.

Figure 8:
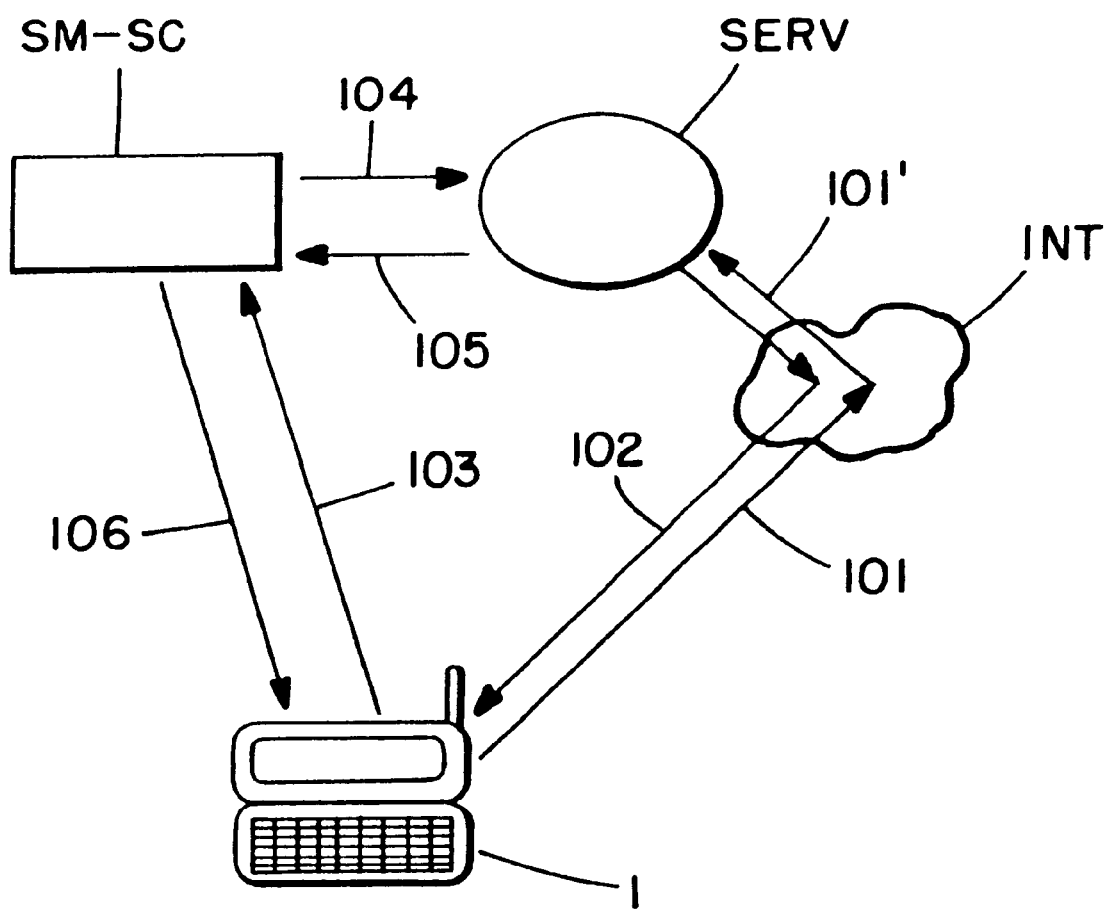
FIG. 8 illustrates the transmission of the application related information, illustrated in FIG. 7, from the system's viewpoint.

In the following, another application, which has not been pre-stored in a terminal, will be discussed by referring to FIGS. 7–9, and to Appendix 1. By means of the terminal, electronic mail can be sent through a mobile communications network. Correspondingly, by means of the terminal, a communications link can be established to the Internet through a mobile communications network. This communications link can be established by connecting a computer to a mobile station, by means of a data card, in which case a user interface of the computer can be utilised for reading pages and services on the Internet. Alternatively, a communications link to the Internet can be established by means of a communicator, which comprises in itself a user interface for reading pages and services on the Internet. A communicator of this type has been presented in Finnish patent application titled 960894 filed on Feb. 26, 1996 with corresponding patent applications claiming priority from the above and filed at the EPO on Jan. 27, 1997 with application number 97101184.6 and in the United States on Jan. 23, 1997, the description of which is incorporated herein by reference thereto. Computer programs by means of which a communications link to different pages on the Internet can be established, and which enable the so-called surfing on the Internet, are called WWW (World Wide Web) browsers. Currently, a number of different companies have their own service pages on the Internet, through which a user may order information on a service or make orders and reservations. This is accomplished by establishing communication to such a service page and by inputting information on what is required from the provider of services. This information can be either text or selection boxes/keys, by means of which selections are made according to the 'tick the appropriate box' principle. An example of such a service page has been given in FIG. 7a, which illustrates a query page for bus schedules, which a user can download onto the display, e.g., through a telecommunications network, such as the Internet. In this case, the page will be stored in the communicator's memory (e.g., hidden memory) for the duration of the use of the page, and it can be stored in the permanent memory by means of an off-line command. On the page, selections can be made in boxes and additional requests and, for example, contact information for feedback, can be written in the space that may be available on the page. Alternatively, the communicator may automatically offer its own telephone number as the address for the feedback, as presented above in connection with the "Call Me Back" application. As is known, a page on the Internet can be presented in the HTML language (Hyper Text Markup Language. Transforming and presenting a service page from the Internet in the HTML language is known from WWW browsers.

Appendix 1 illustrates the Internet page in FIG. 7 transformed into the HTML language in order to present the page in characters. The characters can be sent in a short message. In the GSM system, a message, whose maximum length is 160 characters, can be sent in a short message. Therefore, in the present invention, a whole page is not preferably transmitted, but only certain information of it. In the HTML code on this service page, both the information to be displayed on the display and the hidden information have been specified. Different types of data have pre-set codes. To send the page according to the present invention, information necessary for the sending of an application related information is added to the HTML code of the page, and this information is hidden from a user, i.e., it will not be included in the graphic presentation of the page. The information has preferably been arranged on the page by the provider of services. Thus, in order to be able to send such a service page as a short message, the provider of services should support the opportunity in question by including in the page in question specific information, at least the telephone number to which a message should be sent. At arrows A–J, illustrated in Appendix 1, there has been given information, which is added to the HTML code in order to send the information on the page in a short message according to the present invention. For example, at the arrow A, a coding method can be indicated by means of a presented specification. The arrow B indicates that the type of the form is a query; the arrow C gives the name or abbreviation of the provider of services; the arrow D indicates the type of service in question; the arrow E gives the name of the service page; the arrow F indicates which form the terminal should use to display the answer; the arrow G gives the telephone number of the receiver, i.e., the provider of services; the arrow H gives the telephone number of a short message service centre through which the message is transmitted. The information indicated by the arrows G and H is essential, at the least. The arrows I and J indicate other specifications, which can be added on the HTML page as necessary. After the arrow J comes the actual HTML code that forms the WWWW page in question.

Correspondingly, a terminal can be pre-set to find specific identifiers in the HTML code, which it picks up from the HTML code and attaches as characters to the data field INFO of the message to be sent (see FIG. 5). For example, a selected time is found on a line indicated by an arrow K as a variable c/o, after which the selected time is presented, which will be obtained as a response to a press of the SEND button. As illustrated in FIG. 7, an uppermost selection box "1B1" has been marked, which is shown in the HTML code on a line indicated by an arrow L as a code checked. When a user presses the SEND button, a variable opt1 will get the value of the selection box, which has been selected when pressing the icon, i.e., the value "1B1", assuming that the uppermost selection box has been selected.

In the example, illustrated in FIG. 7 and Appendix 1, a terminal such as a communicator may, in this way, pick up information from the HTML code on lines indicated by the arrows C, D, G, H, K, and L. The terminal will place, at the beginning, an identifier indicating the application type, here as an identifier "WWWSMS". In addition, from the point indicated by the arrow C, a service provider identifier, on the basis of which the receiver will recognise the information in question, e.g., here a character C, can be placed in front. Furthermore, the service name can be placed correspondingly from the point of the arrow D, the telephone number of the sender from the point of the arrow G, the telephone number of the receiver from the point of the arrow D, and the selections made by the user from the points of the arrows K and L, which functions, so that the values of all the variables (here variables c/o and opt1) on the page are placed in the message. The values of the variables are preferably obtained as a response to a send command, i.e., to a press of the SEND icon. In this case, the data sent in the short message are, e.g., as follows:

WWWSMS[cr]
CErSa[f]
DTreBus[f]
G+358505337397[f]
H+358508771010[f]
08:00 1B1 in which the [cr] character indicates a line feed and the [f] character is a field separator, which indicates the ending of the field and, on the last line, all the selections made by the user are shown, i.e., that the user requests information on the timetable of the buses of the line 1B1 (Holvasti-Keskustori) departing after 08:00 o'clock. On the basis of this, the provider of services is able to send to the user information on the timetable of the bus line in question.

When this type of service page has been downloaded from the Internet, it can then be stored in the memory of the terminal, and later re-used without establishing a communications link to the Internet. Correspondingly, as to application related information pre-stored in the terminal, a specific identifier can be attached to the message, in connection with the sending of the information on the application illustrated in FIG. 7 and Appendix 1, which indicates that the application is a service page downloaded from the Internet, e.g., the identifier 'WWWSMS' as in the example discussed above or 'WWWSMS45', in which the beginning indicates that it is a service page and the last two characters may indicate, e.g., the provider of services.

Sending information of a service page in a short message according to the present invention saves considerably the power consumption of the terminal and, thus, prolongs its useful life, which is an important objective in battery-operated devices. In addition, savings are made in phone call expenses, when query information can be sent together with the short message. The whole system has been illustrated in more detail in FIG. 8. A terminal according to the present invention has been presented with reference numeral 1, by means of which a communications link (reference 101) to the Internet INT can be established. The invention could also be implemented by means of a device having means, according to the present invention, for processing information on an application into a short message, which is sent through an ordinary mobile station by coupling the device to the mobile station. Such a device could be, e.g., a computer. To simplify matters, only a communicator will be discussed here as an example of a terminal according to the invention. When the communications link is established to the Internet by means of a communicator 1, a service page of a provider of services can be downloaded (reference 102) from the Internet into its memory and user interface. By means of solutions known for prior art, the user, after having filled in the page, has sent the service page by means of the communicator 1 to a server SERV of the provider of services, i.e., along route 101–101'. This means that the communications link to the Internet should be open for transmission. In a system according to the present invention, the information on the service page is sent (reference 103) in a short message to a short message service centre SM-SC, which sends it further (reference 104) to the server SERV of the provider of services. The transmission of the service page through the Internet, according to prior art, lasts considerably longer than the transmission of a short message and, thus, due to the present invention, a shorter transmission time is achieved, thereby, effecting a saving in power, since, in the communicator, transmission and reception, in particular, consume a lot of power compared to other functions. In addition, in the solution according to prior art, a circuit-coupled connection is in use in transmission, in which case the communicator is engaged during transmission. On the other hand, the sending of a short message does not engage the circuit-coupled connection, and an additional advantage is that the short message service centre SM-SC will send the message to a receiver later, if the telephone number of the provider of services happens to be unreachable during the transmission of the message.

When the user has in this way sent the provider of services a query, the provider of services will interpret it and respond to it. The provider of services may also send the response (reference 105–106) as a short message, and it can, in the same way as in the transmission of the service page, contain HTML codes, which the communicator will interpret and transform into a form legible to the user. Thus, the sending of a response has the same advantages as the sending of an query. For the response, the original service page downloaded from the Internet, can be arranged on the display by the application running HTML code pages, so that it has space (fields) ready for the response. When the user sends the query to the provider of services, he/she stores the page in the communicator. The response will have, in the same way as in transmission, specific identifiers, in which case, as the response arrives, the communicator will run the specific application and open, on the display, the page in question and place the response in the area provided or it, whereupon the situation from the user's viewpoint looks as if he/she has received a WWW page containing the response. The response from the provider of services can also be, e.g., in a form of an application 'DTMF Service Commands' or in a corresponding form.

Instead of an application identifier being indicated as a code in a short message (in data field INFO), it can be indicated in an address field ADD of the short message, in which case it is given in bits. A certain byte in the address field of the transmission frame of the short message is a so-called TP-Data-Coding-Scheme, which has been specified in the GSM specification as GSM 03.40 and 03.38. The four less significant bits of the byte can be freely used, whereupon they can be used to indicate the type of the application to be sent according to the present invention. Different types of applications can be indicated by means of these four bits according to the example given in the following table, wherein bits are marked with references $b_3$–$b_0$, in which $b_0$ is the least significant bit (LSB) of the aforementioned byte:

| $b_3$ | $b_2$ | $b_1$ | $b_0$ | type |
|---|---|---|---|---|
| 0 | 0 | 0 | 0 | Business Card |
| 0 | 0 | 0 | 1 | Call Me Back |
| 0 | 0 | 1 | 0 | Meeting Proposal |
| 0 | 0 | 1 | 1 | Meeting Proposal Answer |
| 0 | 1 | 0 | 0 | Meeting Confirmation |
| 0 | 1 | 0 | 1 | Free-TimeQuery |
| 0 | 1 | 1 | 0 | Position |
| 0 | 1 | 1 | 1 | Trip request |
| 1 | 0 | 0 | 0 | DTMF ServiceCommands |
| 1 | 0 | 0 | 1 | Menu |
| 1 | 0 | 1 | 0 | WWWSMS01 |
| 1 | 0 | 1 | 1 | WWWSMS02 |
| 1 | 1 | 0 | 0 | WWWSMS03 |
| 1 | 1 | 0 | 1 | WWWSMS04 |
| 1 | 1 | 1 | 0 | Phone Book |
| 1 | 1 | 1 | 1 | Short Dial |

Identifying the application in this way does not take the space reserved for the character length (max. 160 characters) of the message. When this type of identification is used, it is also possible to receive the information on the application sent by means of an ordinary mobile station, but in this case, the user is unable to see, in connection with the message, that it is the information from a specific application, unless this information is programmed in the mobile station. Neither can the information on this type of application be sent by means of an ordinary mobile station, because the user is unable to add this type of identifier to the message. Naturally an ordinary mobile phone does not support the different applications.

In the following, the implementation of a terminal, in this case a wireless terminal according to the present invention, and its operation in transmitting and receiving an application related information will be discussed in more detail by referring to FIG. 9.

Figure 9:
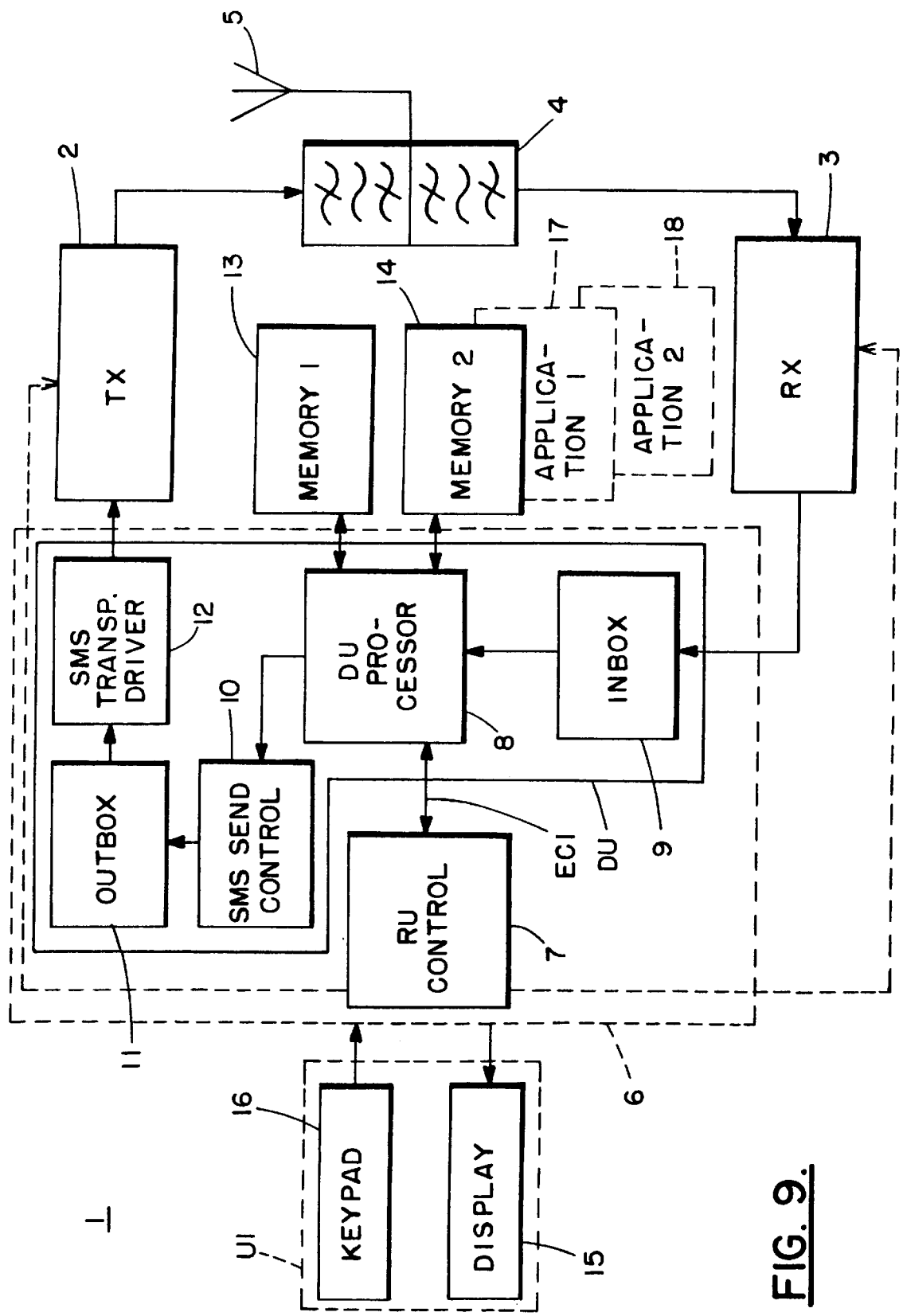
FIG. 9 illustrates the implementation of the terminal according to the present invention.

In FIG. 9, there is a block diagram of the implementation of a terminal according to the present invention, which in the figure is shown as a device also having means for transmission over the air such as a mobile phone. However a similar implementation can be used for a terminal device of a service provider which usually does not have means for direct radio frequency transmission but is connected to such means (e.g. a base station) over the network as is shown in FIG. 2 (e.g. the personal computer PC or server GTW). The terminal is preferably a mobile phone or communicator, which has circuits and a user interface that enable the processing of different applications. The terminal 1 in FIG. 9 comprises, for communication using radio communication, a radio unit RU (the reference has not been marked in the figure), which comprises a transmitter branch 2, known from an ordinary mobile station, (comprising blocks implementing coding, interleaving, ciphering, modulating, and transmitting), a receiving branch 3 (comprising receiving, de-modulating, de-ciphering, de-interleaving, and implementing blocks) and, for transmission using radio communication, a duplex filter 4 that distinguishes between a received and transmitted message, as well as an antenna 5. The terminal has a main control circuit 6 that controls its operation. Furthermore, the main control circuit 6 comprises still a RU controller 7 that carries out control functions of an ordinary mobile station. In addition, the terminal main control circuit 6 comprises blocks 8–12 for carrying out the functions of a data processing unit of the terminal and for sending application related information as a short message according to the present invention. Thus, the blocks 8–12 can be said to form a data processing unit DU of the terminal. The controls of the radio unit RU and the terminal's data processing unit DU do not have to be integrated into the main control circuit but, instead, they could also be implemented apart from each other, so that the RU control circuit 7 is on the radio unit's side, and on the data processing unit's side, there is the DU processor 8, which is in connection with the RU control circuit 7 for establishing communication between the radio unit and the data processing unit. In the implementation illustrated in FIG. 8, a first memory 13 is coupled to the main control circuit 6. The first memory can be a volatile memory, e.g., RAM, where the main control circuit stores in-use data. In addition, the terminal has a second memory 14, which is preferably a permanent memory 14, wherein the terminal's application programs performing different kinds of services and running the different types of applications, other data essential for the functioning of the terminal, and any other data which a user wants to store permanently, are stored. Alternatively, the application related information can be stored off-line in a memory of an external smart card, coupled to the terminal, wherefrom there is a connection to the main control circuit 6. This type of smart card is known, e.g., from the GSM mobile communications system, as a SIM card (Subscriber Identity Module), which usually has storage, e.g., for storing telephone numbers. In this case, new applications can be updated in the terminal by simply updating the memory of the smart card.

For viewing applications, the terminal has a display 15, and for inputting data, a keyboard or other input device 16, such as a touch display.

In the case where the data processing unit DU and the radio unit RU are implemented as functionally independent units, both of them should, however, have either common or separate memories 13, 14, and a user interface UI. Communication between the units would be established by means of a connection between the DU processor 8 and the RU control circuit 7 which, in this connection, is referred to as an external control interface ECI.

In the following, we will discuss the implementation and operation of the terminal, when transmitting application related information. By means of the user interface UI, the required application is brought onto the terminal's display, in which case, on the basis of 16 commands from input devices, the control circuit 7 retrieves from the memory 14, wherein applications 17, 18 programmably handling the application related information have been stored, the selected application stored therein onto the display 15 or retrieves a service from the telecommunications network as presented above. The application relating to a service is processed in the DU processor 8, which also controls the transmission of application related information by maintaining contact with the RU control circuit 7, which controls the operation of the radio unit RU. An application contains information, as illustrated in FIG. 6. The information can be in one or more fields, which have either been ready filled in (if a record of an application already containing information was retrieved from the memory) or its data fields are empty, in which case a user may input information in the fields by means of the input devices 16 or modify the information in the fields. When the application contains the required information and the user enters, by means of the input devices, a command to send the application related information, the DU processor 8 forms, from the information on the application, a line of characters, so that it places at the beginning of the line the application identifier (unless the identifier is given in the address field), and after that, e.g., the information contained in the different fields, separated by line feed characters, in alpha-numeric characters including the possible space between the characters. Hence, the DU processor 8 comprises, for the processing of the characters, word processing program-like functions, which have been implemented by programming and stored in the memory 14, wherefrom the DU processor 8 retrieves the program and performs the functions according to the program. The DU processor 8 transfers the line of characters formed to a SMS transmission controller 10, which adds to the message address information, i.e., the information on the destination either on the basis of the user input information or by retrieving it from another application, e.g., from the calendar application as presented above. Thus, this type of SMS transmission controller is a kind of bit and/or character generator. The calendar is preferably implemented as an application program, stored in the memory 14, which is used by means of the DU processor 8. Thus, communication between two different applications 17 and 18 is established by means of the DU processor, which thereby, e.g., on the basis of time information retrieved from one application, opens up or enters information in the other application (e.g. in the calendar at the time in question).

When address information has been added at a SMS transmission controller 10, the message is transferred into an inbox 11, which tries to send the message, and which has a buffer wherein the message is stored in case the transmission fails. If the transmission fails, the inbox 11 re-tries to send the message. When the DU controller 8 notices that the radio unit RU is ready to send the message, the message is transferred to a message transfer running circuit 12, which adds to the message information relating to the mobile communications system in question, such as validity information (which indicates to which direction the message is going, i.e., from a mobile station to a message service centre or vice versa), processes the address information into a form required by the mobile communications system, and adds to the message the address of the message service centre, as well as the short message identifier (SAPI), and forms from the information to be transmitted, e.g., a digital signal for a transmitter 2, and sends the message to the radio transmitter branch 2 of the radio unit RU. In the case where the application identifier is placed in bits in the address field ADD, the running circuit 12 adds to the message the identifier in question. The transmitter branch 2 codes the signal according to the specifications of the mobile communications system, and forms, on the basis of the signal it receives from the running circuit 12, the frames to be transmitted, which the transmitter sends using radio communication to the short message service centre SM-SC, wherefrom they are sent further to the receiver (see FIG. 1). In the transmitter branch 2, the message is processed according to the mobile communications system, e.g., coding, interleaving, ciphering, burst forming, modulating, and transmission.

In the following, we will discuss the implementation and operation of the terminal in receiving application related information. When the terminal receives a short message containing information for an application, the message first arrives at the radio unit RU. There, at a receiving branch 3, the processing of the message takes place according to the mobile communications system, such as reception, demodulating, de-ciphering, de-interleaving, and decoding. If the received frame identifier (SAPI) indicates that the message is a short message, it will be transferred into a destination box 9 of the data processing unit, which can be a memory for storing the message. If the received message is an ordinary short message, the DU processor 8 will report the short message received. If the message has an identifier, which indicates that it is an application related message, the DU processor 8 will launch the application 17, 18 in question, and place the information, from the received message, in the application in accordance with the markings on the received message. Hence, the reception of the user message (e.g. short message) will be displayed to a user as received application related information.

A terminal according to the present invention provides a simple way of transmitting and receiving application related information. Also the present invention provides a terminal that can have access to a enormous amount of service, e.g. by using the described Menu application. By especially using short messages as communication form the reaching of the destination is guaranteed, and with the user messages in general an optimum current consumption is achieved. The use of an authorisation token in relation to a user message describes a new method of adding security to a user message.

This paper presents the implementation and embodiments of the invention with the help of examples. It is obvious to a person skilled in the art, that the invention is not restricted to details of the embodiments presented above, and that the invention can be implemented in another embodiment without deviating from the characteristics of the invention. Thus, the presented embodiments should be considered illustrative, but not restricting. Hence, the possibilities of implementing and using the invention are only restricted by the enclosed patent claims. Consequently, the various options of implementing the invention as determined by the claims, including the equivalent implementations, also belong to the scope of the present invention.

What is claimed is:

1. A method of transferring electronic business cards between a first device and a second device, the second device being remote from the first device, and the first device being one of a mobile station of a mobile communications network, and of a computer having a connection to the mobile communications network, and the second device being another mobile station of the mobile communications network, the method comprising:

retrieving an electronic business card from a business card application of the first device, said business card application containing a plurality of electronic business cards each having a number of data fields, said electronic business card having at least a name as one of the data fields and a phone number as another one of the data fields;

transmitting said business card to the second device via the mobile communications network; and storing the received business card in a corresponding business card application of the second device, and using at the second device the name and the phone number of the received electronic business card to short dial.

2. A method according to claim 1, wherein the data fields are separated by field separators which can be recognized by the second device.

3. A method according to claim 1, wherein the electronic business card has at least a name as one of the data fields and a phone number as another one of the data fields.

4. A method according to claim 1, wherein the step of transmitting includes transmitting said business card in a user message.

5. A method according to claim 4, wherein the user message includes an identifier identifying the message as an electronic business card.

6. A mobile station of a mobile communications network, the mobile station having means for wireless communication over the mobile communications network, the mobile station comprising:

a memory for storing electronic business cards each having a number of data fields, means for sending one of the electronic business cards via the mobile communications network, means for receiving an electronic business card via the mobile communications network and for storing received electronic business cards in the memory, wherein at least one of said received electronic business cards has at least a name as one of the data fields and a phone number as another one of the data fields, and means for using the name and the phone number of the at least one of said received electronic business cards to short dial.

7. A mobile station according to claim 6, and further comprising means for sending said electronic business card in a user message.

8. A mobile station according to claim 7, wherein said user message is one of a short message, a message according to the standardized SMS message, a message according to the standardized R data field message, a message according to the standardized USSD message, a message according to the standardized SOC message, and a message according to a wireless packet radio service.

9. A mobile station according to claim 6, wherein said user message comprises ASCII characters.

10. A mobile station according to claim 6, wherein said user message comprises an identifier identifying said user message as an electronic business card.

* * * * *

UNITED STATES PATENT AND TRADEMARK OFFICE
CERTIFICATE OF CORRECTION

PATENT NO.    : 6,370,389 B1
DATED         : October 30, 1998
INVENTOR(S)   : Isomorso et al.

It is certified that error appears in the above-identified patent and that said Letters Patent is hereby corrected as shown below:

In the Spec: Please insert the attachment. (Appendix 1).

Signed and Sealed this

Fourteenth Day of September, 2004

JON W. DUDAS
*Director of the United States Patent and Trademark Office*

Appendix 1

```
           <head><title>WWW SMS TRE NEXT BUS</title></head>
           <html><body>
           <form METHOD="SMS"
           ACTION="None"
A→         ENCTYPE="b6"
           >
           <SMS_FORM_INFO
B→         FORM_TYPE="Req"
C→         PROVIDER="ErSa"
D→         SERVICE="TreBus"
E→         FORM_NAME=TBReq"
F→         RESPONSE_FORM="TBRes"
G→         TARGET_NUMBER="+358505337397"
H→         SERVICE_CENTER="+358508771010"
I→         FIELD_NAMES="N"
J→         PROTOCOL-ID="None"
           >
           <h2><p align=center>Tampere bus traffic SMS query</p></h2>
           <h1><p align=center>Tampere</h1></p>
           <table bgcolor=white width=95% cellspacing=2 border=2>
           <tr><td align=center>Select the bus line, the time of departure from the
           terminal for the next bus you want to know about, and then press
           'SEND'</td></tr>
           <tr><td align=center>Give the time, if you want to know the times of
           departure of the lines departing after a specific time, otherwise, select
           'Now'
K→         <SELECT NAME="clo">08:00
               <OPTION>Now
               <OPTION>05:00
               <OPTION>06:00
               <OPTION>07:00
               <OPTION>08:00
               <OPTION>09:00
               <OPTION>10:00
               <OPTION>11:00
               <OPTION>12:00
               <OPTION>13:00
               <OPTION>14:00
               <OPTION>15:00
               <OPTION>16:00
               <OPTION>17:00
               <OPTION>18:00
               <OPTION>19:00
               <OPTION>20:00
               <OPTION>21:00
               <OPTION>22:00
               <OPTION>23:00
```

Appendix 1

```
        <OPTION>24:00
        <OPTION>01:00

</SELECT><P>
    </td></tr>
L→  <tr><td><input type=radio checked name="opt1"
    value="1B1"><b>Line 1 Holvasti - Keskustori</b></td></tr>
    <tr><td><input type=radio name="opt1" value="1B2"><b>Line 1
    Härmälä - Keskustori<b></td></tr>
    <tr><td><input type=radio name="opt1" value="1B3"><b>Line 1
    Keskustori - Holvasti<b></td></tr>
    <tr><td><input type=radio name="opt1" value="1B4"><b>Line 1
    Keskustori - Härmälä<b></td></tr>
    <tr><td><input type=radio name="opt1" value="2B1"><b>Line 2
    Keskustori - Rahola<b></td></tr>
    <tr><td><input type=radio name="opt1" value="2B2"><b>Line 2
    Keskustori - Rauhaniemi<b></td></tr>
    <tr><td><input type=radio name="opt1" value="2B3"><b>Line 2 Rahola -
    Keskustori <b></td></tr>
    <tr><td><input type=radio name="opt1" value="2B4"><b>Line 2
    Rauhaniemi - Keskustori<b></td></tr>
    <tr><td align=center><h2><input type=submit
    value="SEND"></td></tr></h2>
    </table>
    </form>
    </body>
    </html>
```